United States Patent [19]
Gochman et al.

[11] Patent Number: 5,764,932
[45] Date of Patent: Jun. 9, 1998

[54] METHOD AND APPARATUS FOR IMPLEMENTING A DUAL PROCESSING PROTOCOL BETWEEN PROCESSORS

[75] Inventors: Simcha Gochman, Timrat; Gil Stoler, Kiryat, both of Israel

[73] Assignee: Intel Corporation, Santa Clara, Calif.

[21] Appl. No.: 771,529

[22] Filed: Dec. 23, 1996

[51] Int. Cl.$^6$ .............................. G06F 13/14; G06F 13/38
[52] U.S. Cl. .................................... 395/287; 711/146
[58] Field of Search ............................ 395/287, 670, 395/676, 200.57; 711/141, 146

[56] References Cited

U.S. PATENT DOCUMENTS

| | | | |
|---|---|---|---|
| 5,506,971 | 4/1996 | Gullette et al. | 396/296 |
| 5,530,933 | 6/1996 | Frink et al. | 711/141 |
| 5,555,382 | 9/1996 | Thaller et al. | 395/293 |
| 5,561,783 | 10/1996 | Vanka et al. | 711/141 |
| 5,579,504 | 11/1996 | Callander et al. | 711/144 |
| 5,652,859 | 7/1997 | Mulla et al. | 711/146 |
| 5,682,516 | 10/1997 | Sarangdhar et al. | 711/146 |

*Primary Examiner*—Gopal C. Ray
*Attorney, Agent, or Firm*—Blakely, Sokoloff, Taylor & Zafman

[57] ABSTRACT

To improve computer performance, a second processor can be added to a computer system. However, when a second processor is added to a computer system, a dual processing protocol is required to ensure that the two processors share the computer resources. A robust dual processing protocol is introduced that allows two processors to share a single processor bus in an efficient manner. The dual processing protocol allows pipelined bus transfers wherein partial control of the bus is transferred. Furthermore, the dual processing protocol ensures cache coherency by having any modified cache line written back to main memory when a memory location represent by a modified internal cache line is accessed. The dual processing Protocol is designed to support a well defined fair and robust arbitration DP protocol between two processors that is independent of the core frequency and the bus fraction ratio. As such, the dual processing protocol is functional even if the two processors are running with different bus fractions ("heterogeneous DP"). The dual processing protocol is a Pure Bus Clock based protocol such that all the indications on the private interface are in pure bus-clock domain. This enables running in high core frequency, while not affecting the board related private interface parameters (such as flight time, valid/setup/hold of the processors private pins)—which makes the protocol robust and applicable to future upgrades/products with much higher internal frequencies.

18 Claims, 9 Drawing Sheets

METHOD AND APPARATUS FOR IMPLEMENTING A DUAL PROCESSING PROTOCOL BETWEEN PROCESSORS

1. Field of the Invention

This invention relates to the field of multi-processor computing. Specifically, the invention relates to a dual processing protocol for arbitrating system resources between two processors.

2. Art Background

To improve the processing performance of computer systems, more than one processor can be used to process instructions. Computer system that employ more than one processor are referred to as multi-processor systems.

In multi-processor in a computer system, the different processors must cooperate to share resources of the computer system. For example, the different processors must share memory, bus systems, and input/output devices. To share such computer system resources, multi-processor computer systems implement arbitration protocols.

One type of multi-processing computer system that is often implemented is a dual-processor computer system. A dual-processor computer system contains two computer processors that communicated with each other to share resources. To efficiently implement a dual-processor system, the two processors can communicate with each other directly instead of through a bus system. Furthermore, a dual processor system can be designed to appear just like a single processor system such that additional hardware design costs for a dual processor system would be minimized. It would therefore be desirable to have dual processor protocol that takes advantage of these effects.

SUMMARY OF THE INVENTION

The present invention introduces dual processor protocol for efficiently sharing a processor bus between two processors. The two processors share the processor bus with a "fair arbitration" scheme wherein each processor with processor bus ownership will grant the processor bus to the other processor if the processor bus is requested. To add further efficiency, the arbitration system implements inter-CPU pipelining wherein partial ownership of the processor bus can be granted.

Each processor has an internal cache memory. To maintain cache coherency, each processor snoops the bus transactions of the other processor. If a modified cache line in an internal cache is accessed, that processor must writeback the modified cache line to main memory. Therefore, the arbitration system must give priority to processors that detect snoop hits on modified cache lines.

Furthermore, external devices can inquire as to the contents of the internal processor caches. If an external device snoops a modified internal cache line, then the processor having the modified internal cache line must writeback the modified cache line to main memory as soon as possible. Thus, the arbitration system must also give priority to processors that detect external hits on modified cache lines.

The dual processing protocol of the present invention is normally a fair arbitration. However, the fair arbitration system can be preempted by hits to internal modified cache lines. Any processor that detects a hit on an internal cache line has priority. Cache hits from external devices get the highest priority.

The dual processing protocol is designed to support a well defined fair and robust arbitration between two processors that is independent of the core frequency and the bus fraction ratio. As such, the dual processing protocol is functional even if the two partner processors are running with different bus fractions ("heterogeneous DP"). The dual processing protocol is a pure bus clock based protocol such that all the indications on the private interface are in pure bus-clock domain. This enables running in high core frequency, while not affecting the board related private interface parameters (such as flight time, valid/setup/hold of the processors private pins)—which makes the protocol robust and applicable to future upgrades/products with much higher internal frequencies.

Other features and advantages of the present invention will be apparent from the accompanying drawings, and from the detailed description that follows below.

BRIEF DESCRIPTION OF THE DRAWINGS

The features and advantages of the present invention will be apparent to one skilled in the art, in view of the following detailed description and drawings in which.

DETAILED DESCRIPTION OF THE INVENTION

Methods and apparatus for implementing a dual processing protocol are disclosed. In the following description, for purposes of explanation, specific nomenclature is set forth to provide a thorough understanding of the present invention. However, it will be apparent to one skilled in the art that these specific details are not required in order to practice the present invention. Well known circuits and devices are shown in block diagram form.

A Dual Processing Signals

Figure 1:
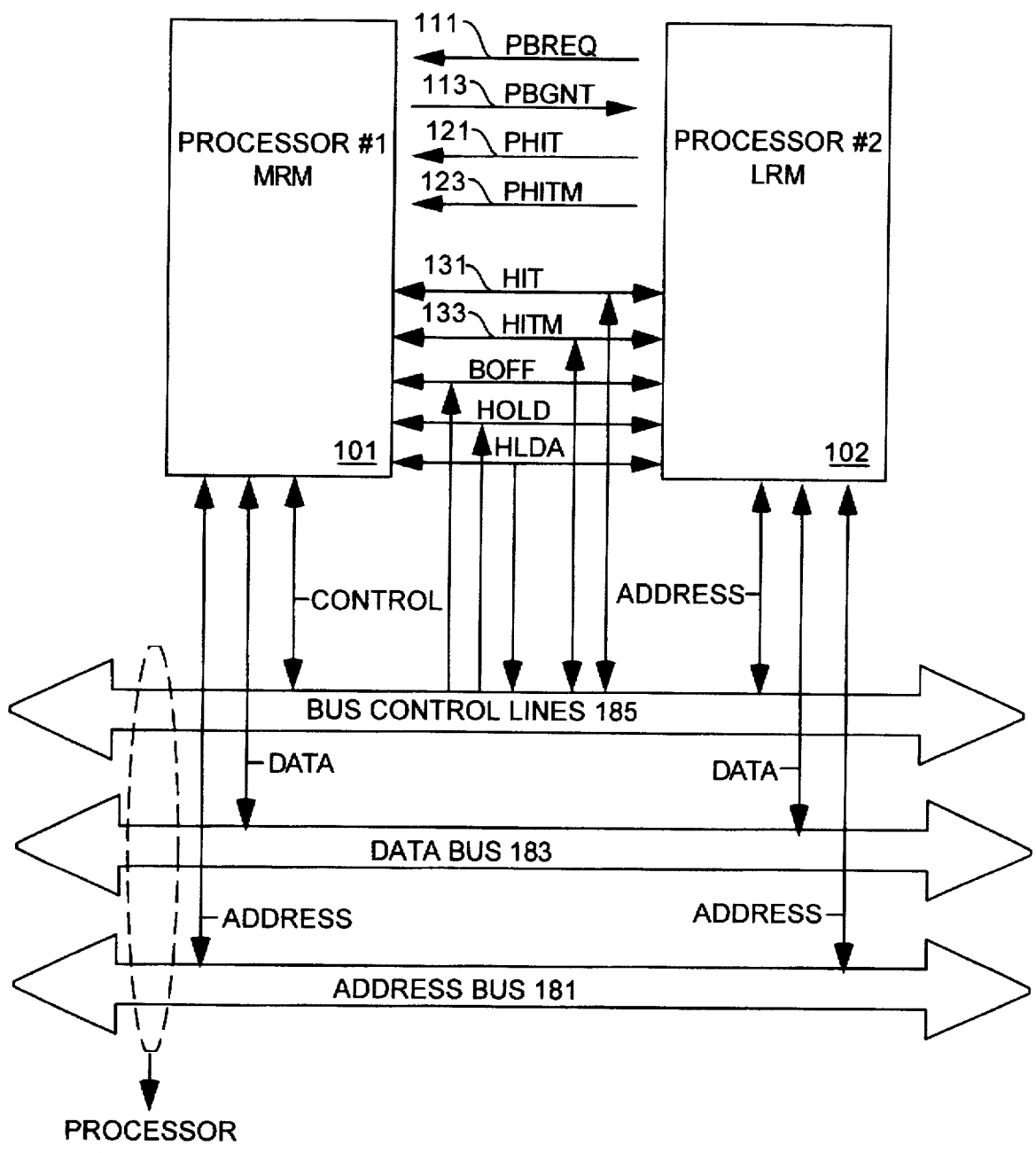
FIG. 1 illustrates a block diagram of a dual-processor computer system.

FIG. 1 illustrates a block diagram of a dual processing computer system that comprises a first processor 101 and a second processor 102. Both processor 101 and processor 102 are coupled to a processor bus 180. The processor bus 180 comprises an address bus 181, a data bus 183, and bus control lines 185. The processor bus 180 connects the processor to a main memory and to computer Input/Output devices such as disk drives, display controllers, and keyboards.

In the present invention, processor 101 and processor 102 share the processor bus 180 using an elaborate dual processing protocol that is implemented with a set of dual processing control lines. In the dual processing protocol of the present invention, there are two main processor states: the "most recent master" (MRM) and the "least recent master" (LRM). The most recent master (MRM) currently owns the processor bus and the "least recent master" (LRM) does not own the processor bus The following table lists the control dual processing control lines that are used to implement the dual processing protocol:

| | |
|---|---|
| PBREQ# | Processor Bus Request - The Least Recent Master asserts this line when the processor bus is needed and the Most Recent Master samples this line. |
| PBGNT# | Processor Bus Grant - The Most Recent Master asserts this line when the processor bus is granted and the Least Recent Master samples this line. |
| PHIT# | Private-Snoop Hit - The Least Recent Master asserts this line if a memory location in its internal cache is being accessed by the Most Recent Master. |
| PHITM# | Private-Snoop Hit Modified - The Least Recent Master asserts this line if a modified memory location in its internal cache is being accessed by the Most Recent Master. |
| HIT# | External Hit - A processor indicates that a memory location in its internal has been hit during an inquire cycle from an external source. |
| HITM# | External snoop Hit Modified - A processor indicates that a modified memory location in its internal has been hit during an inquire cycle from an external source. This modified memory location must immediately be written back to main memory. |
| BOFF# | Back Off signal - An external device has requested that the processors immediately Back-Off the current bus cycle and float the bus. |
| HOLD | Hold request from the system - An external device requests that the processor float the address bus. |
| HLDA | Hold Acknowledge from a processor - The most recent master acknowledges a HOLD request after completing the current bus cycle. |
| AHOLD | Address Hold - An external device requests that the processor float the address bus. The processor must floats address bus immediately in response to the AHOLD signal. |

Note that in this document, active low signals are designated with a "#" suffix (PBREQ#) or with a bar above the signal name (PBREQ).

The Processor Bus Request (PBREQ#) signal is asserted by the Least Recent Master (LRM) processor to request control of the computer bus. In response to the Processor Bus Request (PBREQ#), the Most Recent Master (MRM) will eventually assert the Processor Bus Grant (PBGNT#) signal.

The Private-Snoop Hit (PHIT#) line is used by the Least Recent Master (LRM) to indicate when the Most Recent Master is accessing a memory location stored in the internal cache of the Least Recent Master (LRM). The Private-Snoop Hit Modified (PHITM#) line is asserted by the Least Recent Master (LRM) to indicate when the Most Recent Master is accessing a memory location that has been modified in the internal cache of the Least Recent Master (LRM). Note that the Private-Snoop Hit Modified (PHITM#) line is never asserted without the Private-Snoop Hit (PHIT#) line being asserted simultaneously.

The external snoop Hit (HIT#) line is used by a processor to indicate when an external bus master is accessing a memory location stored in the internal cache. The external Hit Modified (HITM#) line is used by the processor to indicate when an external bus master is accessing a memory location has been modified in the internal cache of the processor. Note that the external snoop Hit Modified (HITM#) line is never asserted without the external snoop Hit (HIT#) line being asserted simultaneously.

The Back-Off (BOFF#) line is used by the computer system to instruct the Most Recent Master to Back-Off from the current bus transaction. The Hold (HOLD) signal is used by the computer system to instruct the Most Recent Master to hold off from issuing any new bus transactions. The Hold Acknowledge (HLDA) signal is used by a processor to acknowledge the Hold request. The Hold Acknowledge (HLDA) signal is driven by the processor that currently owns the address phase of the bus.

The Address Hold signal (AHOLD) signal is asserted by a device that wished to run an inquire cycle to determine if a memory location exists in a processor's internal cache. The processor responds to the AHOLD signal by floating the address bus on the next cycle. No acknowledgment is required since the processor will immediately float the address bus (on the next clock cycle).

Dual Processing States

Figure 2:
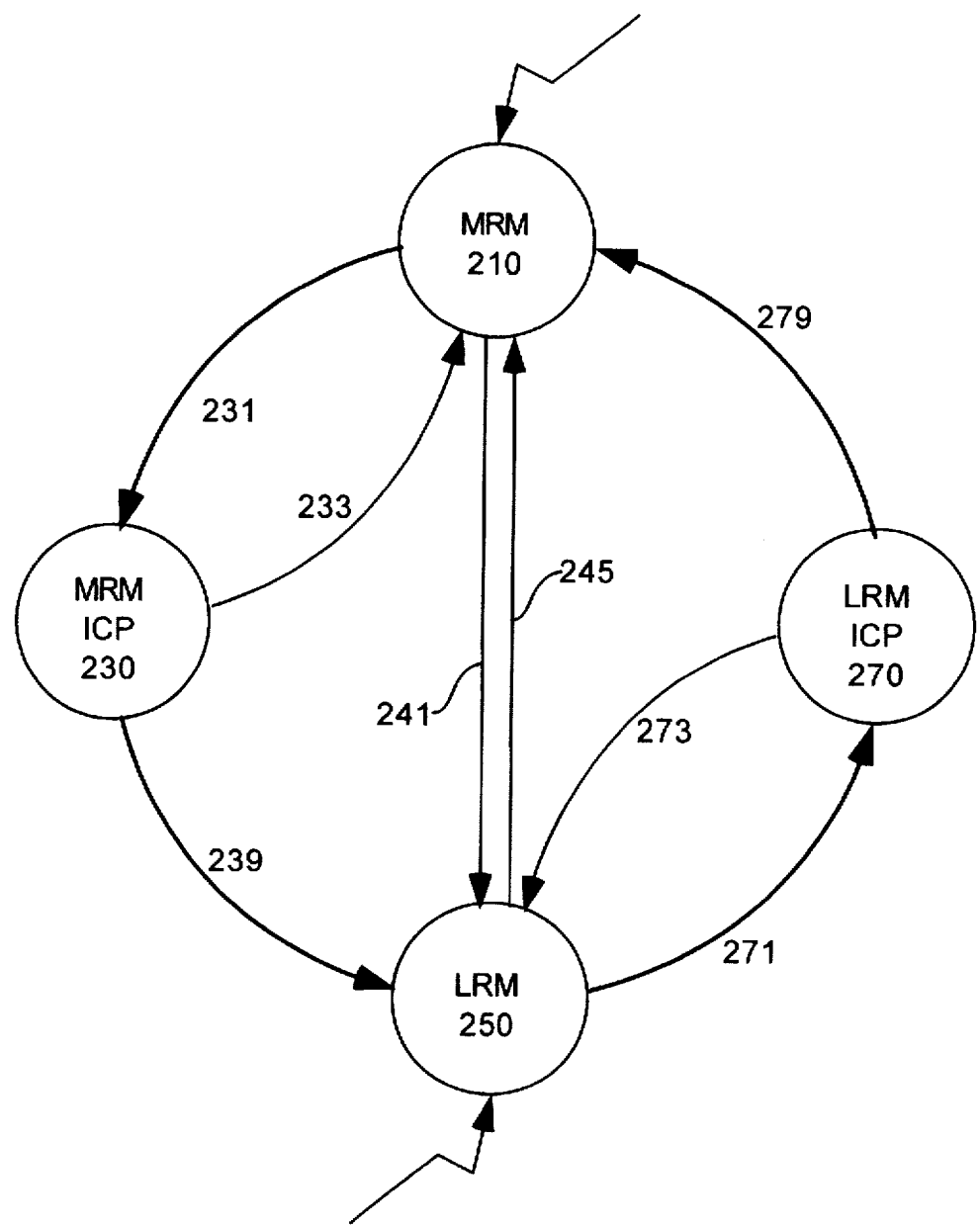
FIG. 2 illustrates a state diagram that describes the possible states of the processors in the dual processing system of the present invention.

During the majority of the time, only one of the processors is a bus master. In FIG. 1, processor 101 is the current bus master and is referred to as the Most Recent Master (MRM). Correspondingly, processor 102 is referred to as the Least Recent Master (LRM). However, the states of the two processors can change such that the situation is reversed. FIG. 2 illustrates a state diagram that lists the different possible states of the processors in the dual processing system of the present invention.

Referring to FIG. 2, the two main states are the Most Recent Master (MRM) state 210 and the Least Recent Master (LRM) state 250. In certain situations, a processor can change from the Most Recent Master (MRM) state 210 directly into the Least Recent Master (LRM) state 250. In such situations, the other processor then changes from the Least Recent Master (LRM) state 250 directly into the Most Recent Master (MRM) state 210.

However, in certain situations the processors may enter a preliminary state between the two main states. The states in between the two main states allow the two processors to share the processor bus. Specifically, the processor that is in the Most Recent Master (MRM) state 210 may enter the Most Recent Master Inter-CPU Pipeline state (MRM-ICP) state 230 before finally entering the Least Recent Master (LRM) state 250. Correspondingly, the processor in the Least Recent Master (LRM) state 250 will enter the Least Recent Master Inter-CPU Pipeline state (LRM-ICP) state 270 before finally entering the Most Recent Master (MRM) state 210. The exact situations where this occurs will be described later.

Transitions Between The Dual Processing States

To describe the transitions between the processor states illustrated in FIG. 2, several examples are illustrated with reference to timing diagrams.

A Simple Bus Master Transfer

Referring back to FIG. 1, the dual processing control lines include a Processor Bus Request line (PBREQ#) 111 that is driven by the least recent master when the least recent Master needs the processor bus. Correspondingly, the Most Recent Master (MRM) samples the Processor Bus Request line (PBREQ#) 111. When the Most Recent Master (MRM) determines it can give away the processor bus, the Most Recent Master (MRM asserts the Processor Bus grant line (PBGNT#) 113.

Figure 3:
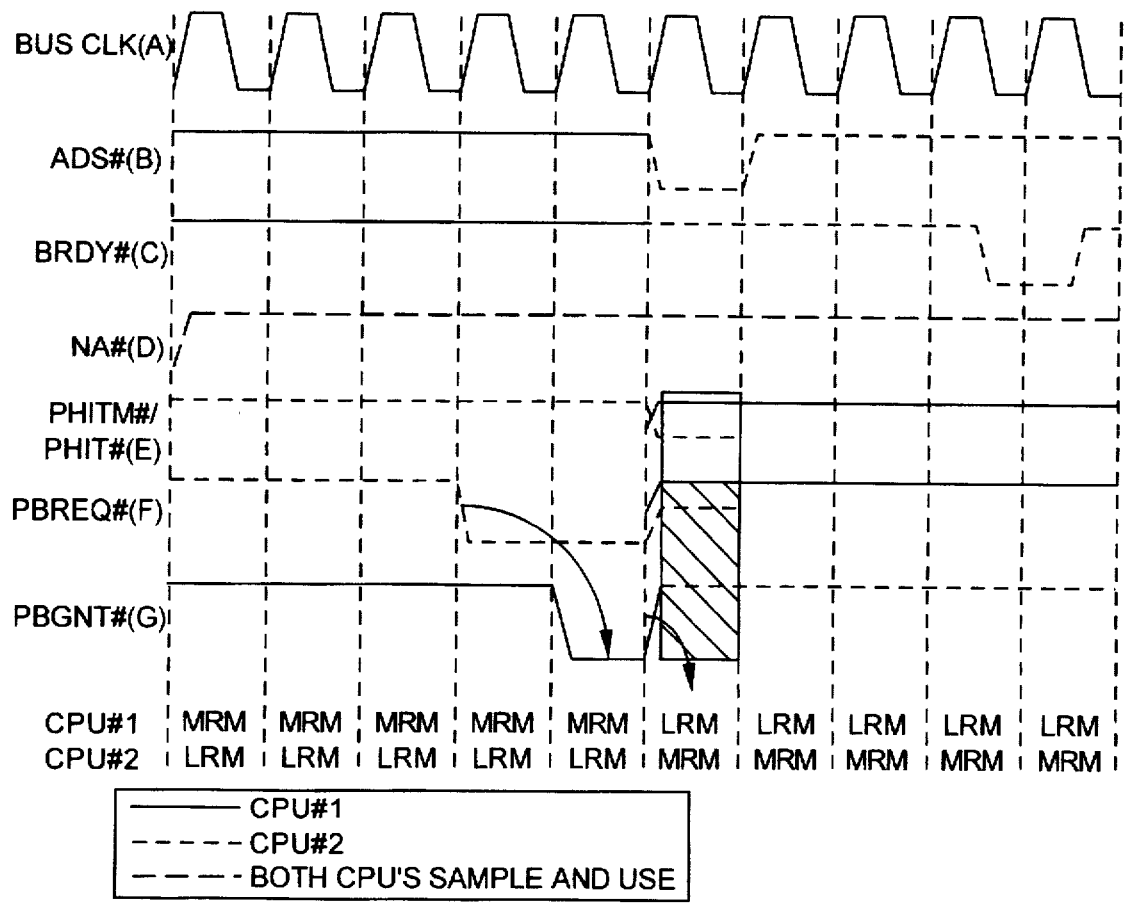
FIG. 3 illustrates a timing diagram example of a simple bus master transfer using the dual processing protocol when the processor bus is idle.

FIG. 3 illustrates a timing diagram that describes such a simple processor bus control transfer. In the timing diagram FIG. 3, the processor bus is idle. When the Least Recent Master (LRM) processor, CPU #2, needs the processor bus, it asserts the Processor Bus Request line (PBREQ#) 111. Since the bus is idle, the Most Recent Master (MRM), CPU #1, immediately grants the processor bus and thus asserts the Processor Bus grant line (PBGNT#) 113.

With this exchange of signals, the Least Recent Master (LRM) processor will immediately become the Most Recent Master processor and the Most Recent Master processor will immediately become Least Recent Master (LRM) processor. Thus, referring to FIG. 2. CPU #1 will transition from Most Recent Master state 210 along transition path 241 to the Least Recent Master (LRM) state 250. Correspondingly, CPU #2 will transition from the Least Recent Master (LRM) state 250 along transition path 245 to the Most Recent Master state 210.

A Delayed Bus Master Transfer

Figure 4:
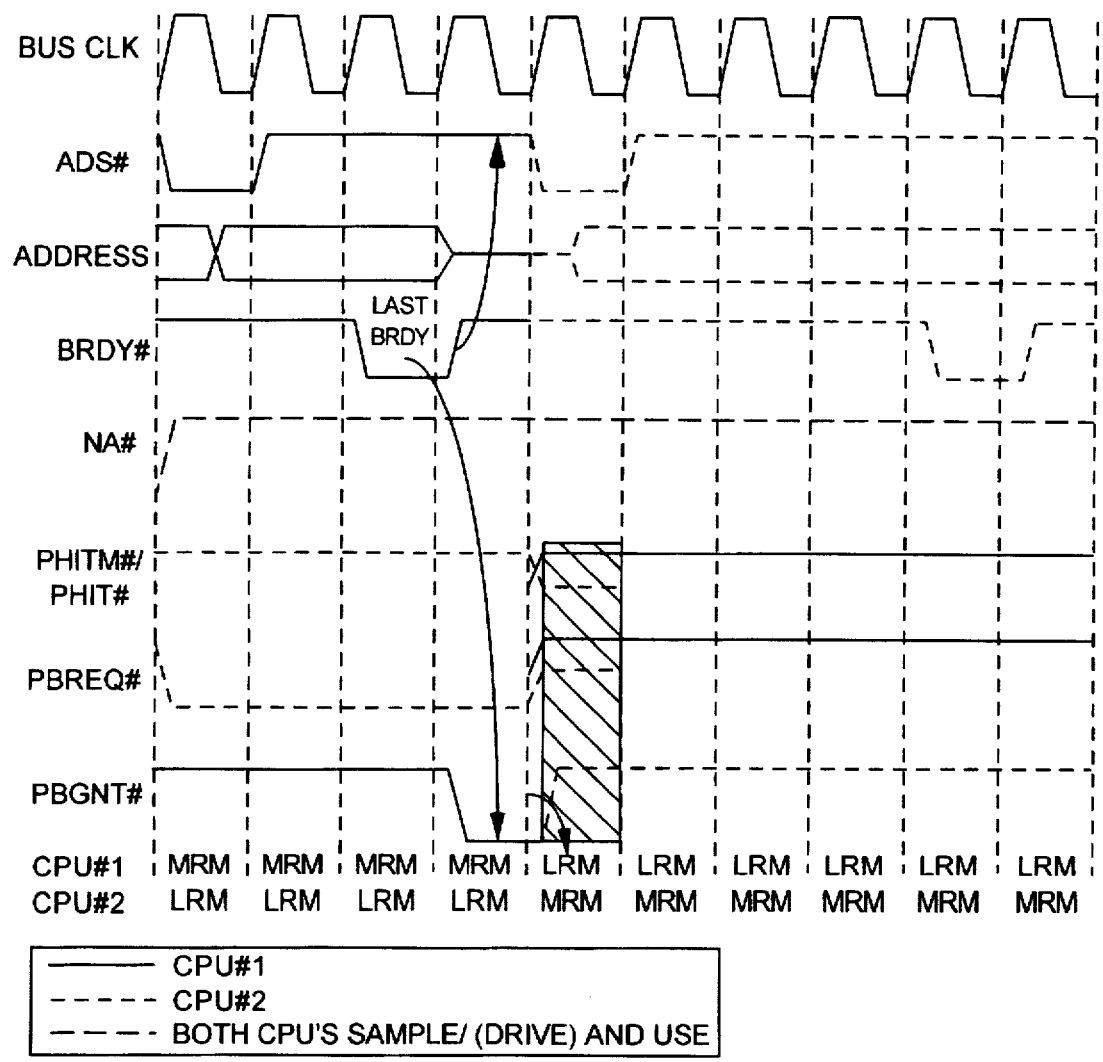
FIG. 4 illustrates a timing diagram example of a simple bus master transfer using the dual processing protocol when the processor bus is being used by the Most Recent Master.

The processor bus is usually not idle. FIG. 4 illustrates a timing diagram that describes a transfer of processor bus control while the processor bus is being used.

Referring to FIG. 4, the processor bus is being used by CPU #1 as demonstrated by the activity on address lines (ADDRESS) and the Address Strobe line (ADS#). However, the Least Recent Master (LRM) processor, CPU #2, needs the processor bus and thus immediately asserts the Processor Bus Request line (PBREQ#) 111. Instead of immediately granting the processor, the Most Recent Master (MRM) processor, CPU #1, waits until it receives its last Burst Ready (BRDY#) from the memory device. Only after the last Burst Ready (BRDY#) is received does CPU #1 grant the processor bus by asserting the Processor Bus grant line (PBGNT#) 113.

After the Processor Bus grant line (PBGNT#) 113 has been asserted, CPU #1 will transition from Most Recent Master state 210 along transition path 241 to the Least Recent Master (LRM) state 250. Correspondingly, CPU #2 will transition from the Least Recent Master (LRM) state 250 along transition path 245 to the Most Recent Master state 210.

An Inter-CPU Pipelined Bus Master Transfer

To more efficiently share the processor bus 180, the present invention introduces a method of granting partial bus control while still retaining some control of the bus. Specifically, the Most Recent Master processor grants control of the address phase of the processor bus while maintaining control of the data phase until the final data is ready. At that point, all control is relinquished and the processor enters the Least Recent Master state. This technique is referred to as "Inter-CPU pipelining." An example of Inter-CPU pipelining is provided with reference to the timing diagram of FIG. 5.

Figure 5:
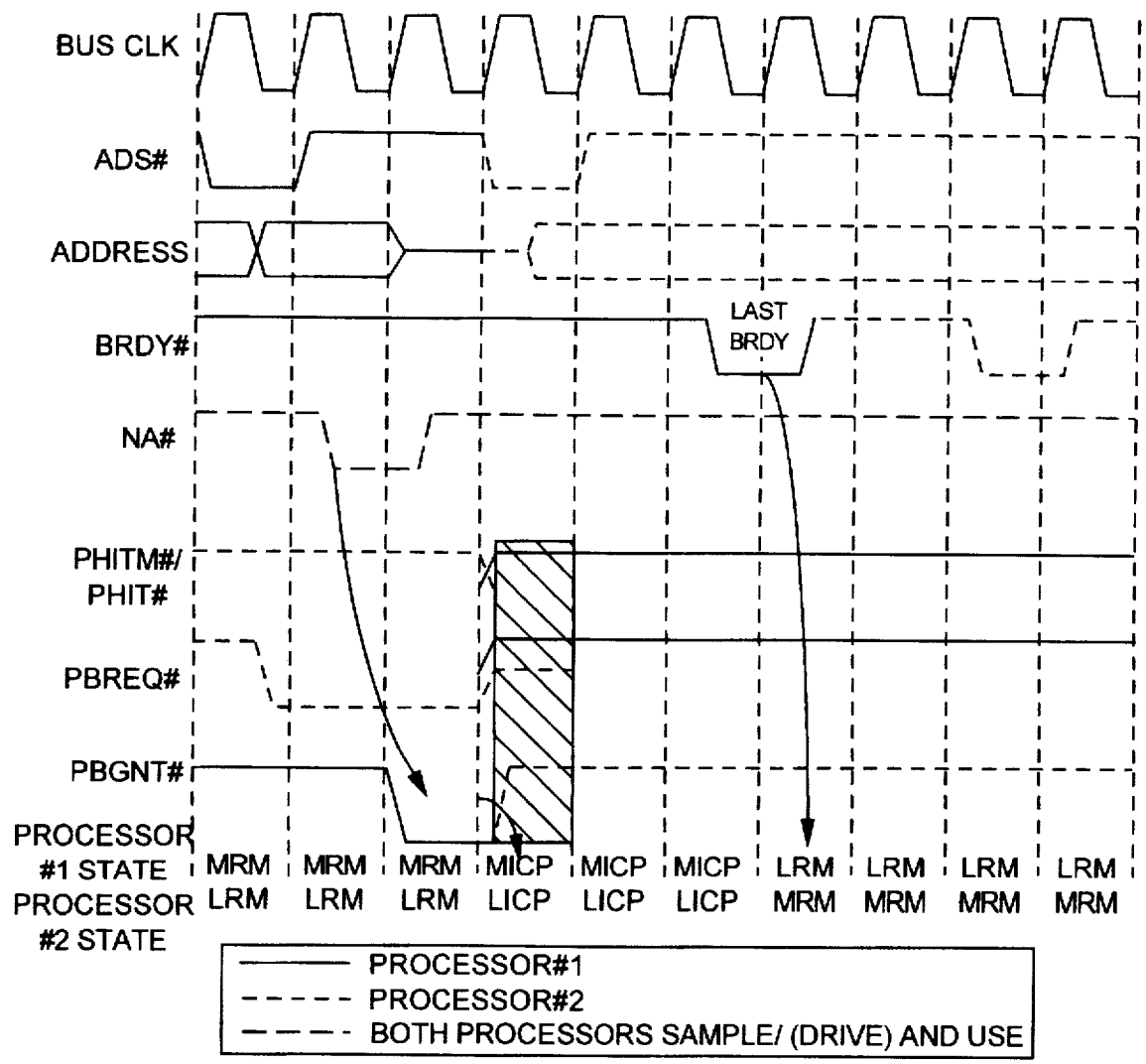
FIG. 5 illustrates a timing diagram example of an inter-CPU pipeline bus master transfer using the dual processing protocol.

Referring to the timing diagram of FIG. 5, processor #1 is the initial Most Recent Master and is busy performing bus operations. However, processor #2 needs the processor bus such that processor #2 asserts the Processor Bus Request line (PBREQ#) 111. Processor #1 continues its bus operations until the last address is sent out and processor #1 is just waiting for some data back from the memory.

In FIG. 5, the memory device asserts a Next Address signal (NA#) to indicate that the memory device is ready for another address. Since processor #1 is finished with the address phase of the bus, the address phase of the bus can be used for another transaction. Thus, processor #1 grants the address phase of the processor bus to processor #2. Referring to FIG. 2, processor #1 grants the address phase of the processor bus to processor #2 by moving from the Most Recent Master (MRM) state 210 to enter the Most Recent Master Inter-CPU Pipeline state (MRM-ICP) state 230.

Correspondingly, processor #2 that was in the Least Recent Master (LRM) state 250 will enter the Least Recent Master Inter-CPU Pipeline (LRM-ICP) state 270. While in the Least Recent Master Inter-CPU Pipeline state (LRM-ICP) state 270, processor #2 can send addresses out on the address bus and assert the address strobe line (ADS#).

Only when the last Burst Ready (BRDY#) signal is received from the memory device will processor #1 fully relinquish control of the bus. Thus, when the last Burst Ready (BRDY#) is received, processor #1 leaves the Most Recent Master Inter-CPU Pipeline state (MRM-ICP) state 230 and enters the Least Recent Master (LRM) state 250 along state transition path 239. Correspondingly, after the last Burst Ready (BRDY#) signal is received, processor #2 leaves the Least Recent Master Inter-CPU Pipeline state (LRM-ICP) state 270 along state transition path 279 and enters the Most Recent Master (MRM) state 210. At this point processor #2 has full control over the processor bus.

An Inter-CPU Pipelined Bus Master Transfer Interrupted by A Back-Off

To remedy deadlock situations, other bus masters can force the processor of the present invention to abort a current bus cycle and float the bus. This is accomplished by asserting the Back-Off line (BOFF#) of the processor.

Figure 6:
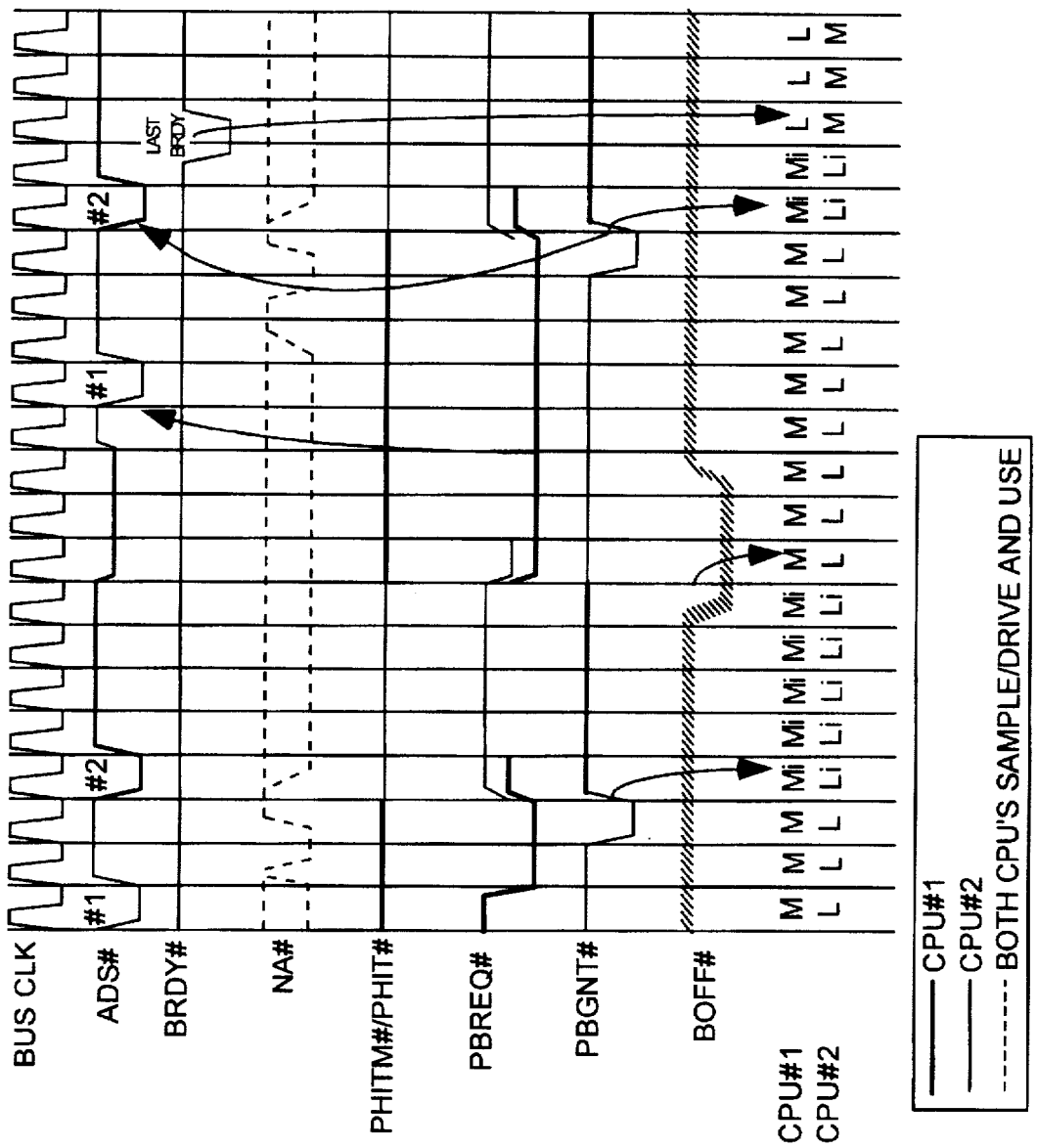
FIG. 6 illustrates a timing diagram example of an inter-CPU pipeline bus master transfer using the dual processing protocol that is interrupted by a Back-Off signal from an external device.

Since the Back-Off line (BOFF#) can force the processor to abandon a current bus cycle, an inter-CPU pipeline bus master transfer can be interrupted. In such situations, the processor that was the Most Recent Master (MRM) and has entered the Most Recent Master Inter-CPU Pipeline state (MRM-ICP) state 230 is forced back to the Most Recent Master (MRM) state 210 in response to a Back-Off signal. Once back in the Most Recent Master (MRM) state 210, the processor can reissue the bus transaction that was abandoned. The reissued bus transactions are reissued in the same order as they were originally issued (within Intel® Pentium® uniprocessor exceptions.) FIG. 6 illustrates an example of how the Back-Off line (BOFF#) can interrupt a bus master transfer.

Referring to FIG. 6, CPU #1 issues its last address and asserts the address strobe (ADS#). At this point it grants partial control of the bus to CPU #2 since CPU #2 has been requesting the bus. Thus, CPU #1 enters the Most Recent Master Inter-CPU Pipeline state (MRM-ICP) state 230 and CPU #2 enters the Least Recent Master Inter-CPU Pipeline state (LRM-ICP) state 270. At this point, CPU #2 owns the address phase of the bus and it issues an address and asserts the address strobe (ADS#).

But before CPU #1 receives its last Burst Ready (BRDY#), some other devices asserts the Back-Off line (BOFF#). The Back-Off line forces both current bus transactions to be aborted. (CPU #1's last bus transition and CPU #2's current bus transition.) Furthermore, both processors revert back to the state that they were in before the inter-CPU pipelining started. Specifically, referring to FIG. 2, CPU #1 is forced from the Most Recent Master Inter-CPU Pipeline state (MRM-ICP) state 230 along state transition path 233 back to the Most Recent Master (MRM) state 210.

Correspondingly, CPU #2 is forced from the Least Recent Master Inter-CPU Pipeline state (LRM-ICP) state 270 along state transition path 273 back to the Least Recent Master (LRM) state 250.

When the Back-Off line (BOFF#) is finally released, CPU #1 can reissue its final bus transaction that was previously interrupted. Similarly, CPU #2 reasserts its request for the processor bus. After CPU #1 has finished sending the address of the bus transaction, it can again grant partial control of the bus to CPU #2 by again entering the Most Recent Master Inter-CPU Pipeline state (MRM-ICP) state 230. Correspondingly, CPU #2 enters the Least Recent Master Inter-CPU Pipeline state (LRM-ICP) state 270 and reissues its bus transaction. Thus, the two bus transactions are reissued the in the same order that they were originally issued. When CPU #1 receives its last Burst Ready (BRDY#), the bus master transfer is completed by having CPU #1 enter the Least Recent Master (LRM) state 250 and having CPU #2 enter the Most Recent Master (MRM) state 210.

Internal Cache Memory Considerations

Each of the processors in the dual processor system of the present invention has an internal cache memory. If a memory location in an internal cache of one of the processors is modified, then any access to that particular memory location must be directed to that internal cache. Similarly, if a memory location in main memory is modified, then any representation of that same memory location in an internal cache must be invalidated. The process of keeping the memory locations consistent is referred to as "cache coherency." To maintain cache coherency, the processors of the present invention use the Private-Snoop Hit (PHIT#) line, the Private-Snoop Hit Modified (PHITM#) line, the external Hit (HIT#) line, and the external Hit Modified (HITM#) line.

The Private-Snoop Hit (PHIT#) line is used by the Least Recent Master (LRM) to indicate when the Most Recent Master is accessing a memory location stored in the internal cache of the Least Recent Master (LRM). The Least Recent Master (LRM) can make this determination since it is snooping the bus transactions of the Most Recent Master (MRM). The Private-Snoop Hit Modified (PHITM#) line is asserted by the Least Recent Master (LRM) to indicate when the Most Recent Master is accessing a memory location that has been modified in the internal cache of the Least Recent Master (LRM).

In should be noted that in the present embodiment, the Private-Snoop Hit (PHIT#) line and the Private-Snoop Hit Modified (PHITM#) line are bus fraction independent. Specifically, the Private-Snoop Hit (PHIT#) line (and the Private-Snoop Hit Modified (PHITM#) line if appropriate) are asserted two clocks after the Address Strobe (ADS#) that caused the private snoop hit regardless of the bus fraction. By asserting the Private-Snoop Hit lines at the second bus clock after the Address Strobe (ADS#), multi-bus fraction dual processing is supported.

The external snoop Hit (HIT#) line is used by a processor to indicate when an external bus master is inquiring about a memory location stored in the internal cache. The external Hit Modified (HITM#) line is used by the processor to indicate when an external bus master is inquiring about a memory location has been modified in the internal cache of the processor. Similar to the Private-Snoop Hit (PHIT#) and the Private-Snoop Hit Modified (PHITM#) lines, the external snoop Hit (HIT#) line and external Hit Modified (HITM#) line (if appropriate) are asserted two clocks after an External Address Strobe (EADS#) that caused the external snoop hit.

It should be noted that the Private-Snoop Hit lines (PHIT# and PHITM#) are used only asserted when a private snoop from other processor detects a cache hit. Similarly, the External Snoop Hit lines (HIT# and HITM#) are only used when a hit occurs during an inquire cycles from an external source. By using the two different types of internal cache Hit lines, various speed paths are eliminated. Furthermore, this allows the two types of internal cache hits to be handled in different manners. For example, Private-Snoop hits are handled in a manner transparent to external devices such that the dual processor system appears exactly like a uniprocessor system.

When a modified cache line is hit, that modified cache line must immediately be written back to main memory. Thus, a processor that detects a cache hit must immediately request the processor bus to write-back the modified cache line. To help accomplish this result, the Private-Snoop Hit Modified (PHITM#) line and the external Hit Modified (HITM#) line act as processor bus requests similar to the Processor Bus Request (PBREQ#) signal. However, both the Private-Snoop Hit Modified (PHITM#) line and the external Hit Modified (HITM#) line have greater priority than the simple Processor Bus Request (PBREQ#). Specifically, the external Hit Modified (HITM#) line acts as a processor bus request with the greatest priority. The Private-Snoop Hit Modified (PHITM#) line acts as a processor bus request with the next highest priority. All other processor bus requests are implemented with the Processor Bus Request (PBREQ#) signal and are treated equally.

The operation of the Private-Snoop Hit (PHIT#), the Private-Snoop Hit Modified (PHITM#), the external Hit (HIT#), and the external Hit Modified (HITM#) lines function are illustrated in the following examples.

Bus Master Transfer Due To A Private-Snoop Hit On A Modified Line

Figure 7:
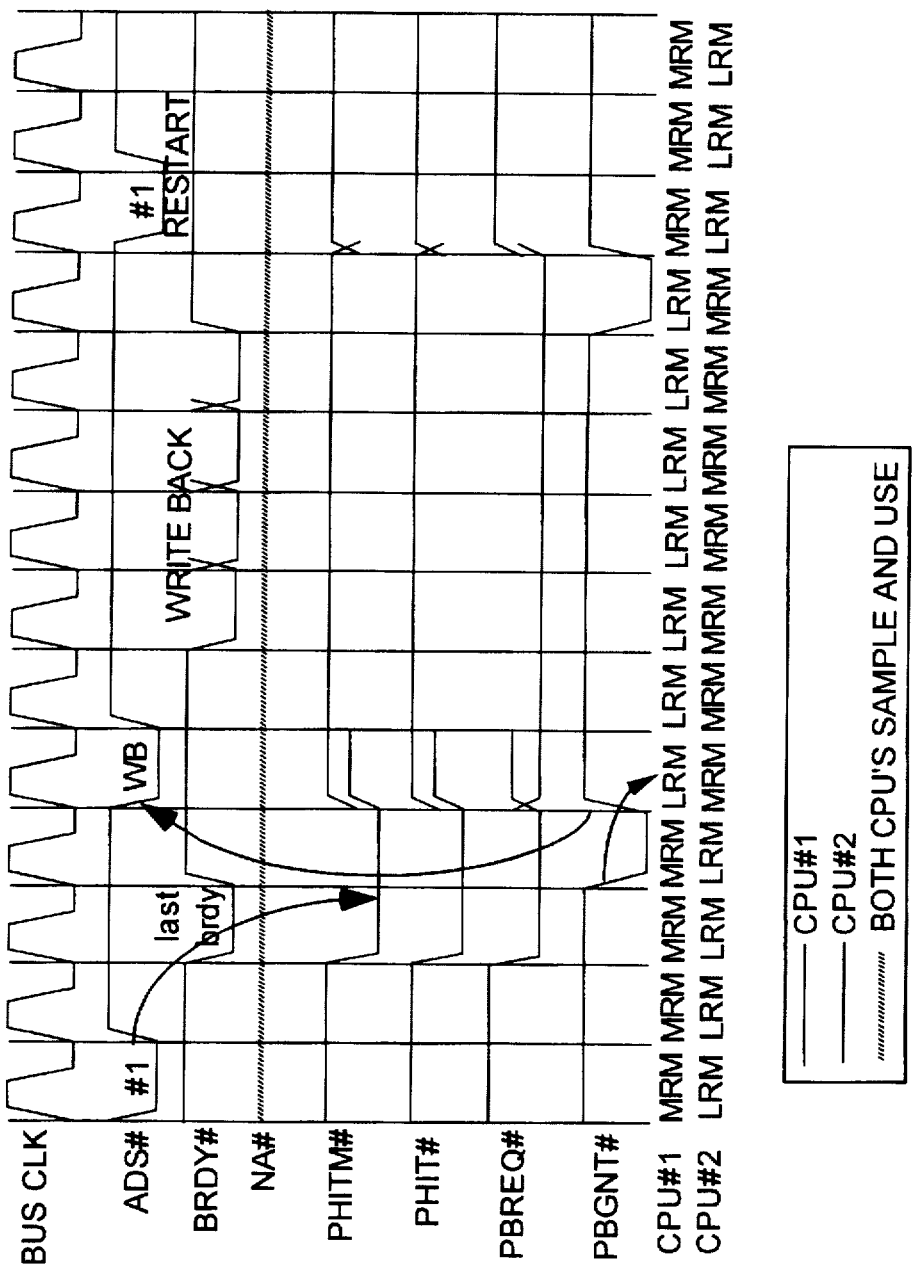
FIG. 7 illustrates a timing diagram example of a bus transaction that is interrupted due to a private snoop hit of a modified line.

When the Most Recent Master processor is performing bus transactions, the Least Recent Master is always snooping the bus transactions to determine if a memory location in its internal caches is accessed. If the most Recent Master attempts to read memory location that has been modified in the cache of the Least Recent Master, then the Least Recent Master must notify the Most Recent Master such that the Least Recent Master can write the modified cache line into memory. The Most Recent Master can then access the modified memory. FIG. 7 illustrates an example of this situation.

Referring to FIG. 7, CPU #1 (the Most Recent Master) issues a bus transaction. CPU #2, that is snooping the bus transactions, notices that it has the accessed memory location in its internal cache and thus asserts the Private-Snoop Hit (PHIT#) line. Furthermore, that particular memory location is modified such that CPU #2 simultaneously asserts the Private-Snoop Hit Modified (PHITM#) line.

Since the memory location has been modified, CPU #2 must write back the modified cache line into main memory such that CPU #1 can access the most current information. By asserting the Private-Snoop Hit Modified (PHITM#) line, CPU #2 is requesting the Processor Bus. In response to the Private-Snoop Hit Modified (PHITM#) line being asserted, CPU #1 grants the bus to CPU #2 such that CPU #2 can perform the write-back. Thus CPU #1 asserts the Processor Bus Grant (PBGNT#) line and thereby giving control of the processor bus to CPU #2.

Once CPU #2 becomes the Most Recent Master (MRM), it performs its write-back. CPU #1 asserts the Processor Bus Request (PBREQ#) line to get the processor bus back as soon as CPU #2 completes its write-back. When CPU #2 completes the write-back, CPU #2 asserts the Processor Bus Grant (PBGNT#) line and thereby giving control of the processor bus back to CPU #1. At this point, CPU #1 reissues its bus transaction to get the current information that was just written back into main memory.

Bus Master Transfer Due To An External Hit On A Modified Line

An external device may wish to inquire as to the contents of the internal cache of a processor. To perform this, the processors of the present invention have "inquire cycles." To issue an inquire cycle, an external device must first obtain control of the address bus. To obtain control of the address bus, the external device can use the Address Hold signal (AHOLD), the Hold (HOLD) signal (which is acknowledged by the HLDA signal), or Back-Off (BOFF#) signal lines. Once the control of the address bus is obtained, the external device places an address on the address bus and then asserts the External Address Strobe (EADS#) line. An assertion of the External Address Strobe (EADS#) line causes the processors to examine their internal caches to see if the memory location on the address lines is represented in the internal cache memory.

If the memory location that was placed on the address bus is represented in an internal cache, there is a hit. Thus, the processor with that cache line asserts the external snoop Hit line (HIT#). If the cache line that has been hit has been modified, then the external snoop Hit Modified (HITM#) line will also be asserted. When a modified cache line has been snooped by an external source, then the processor must write-back the snooped cache line at the next available bus cycle. To illustrate how external snoop hits are handled, an external snoop using the Back-Off (BOFF#) signal line to get the address bus is illustrated in FIG. 8.

Figure 8:
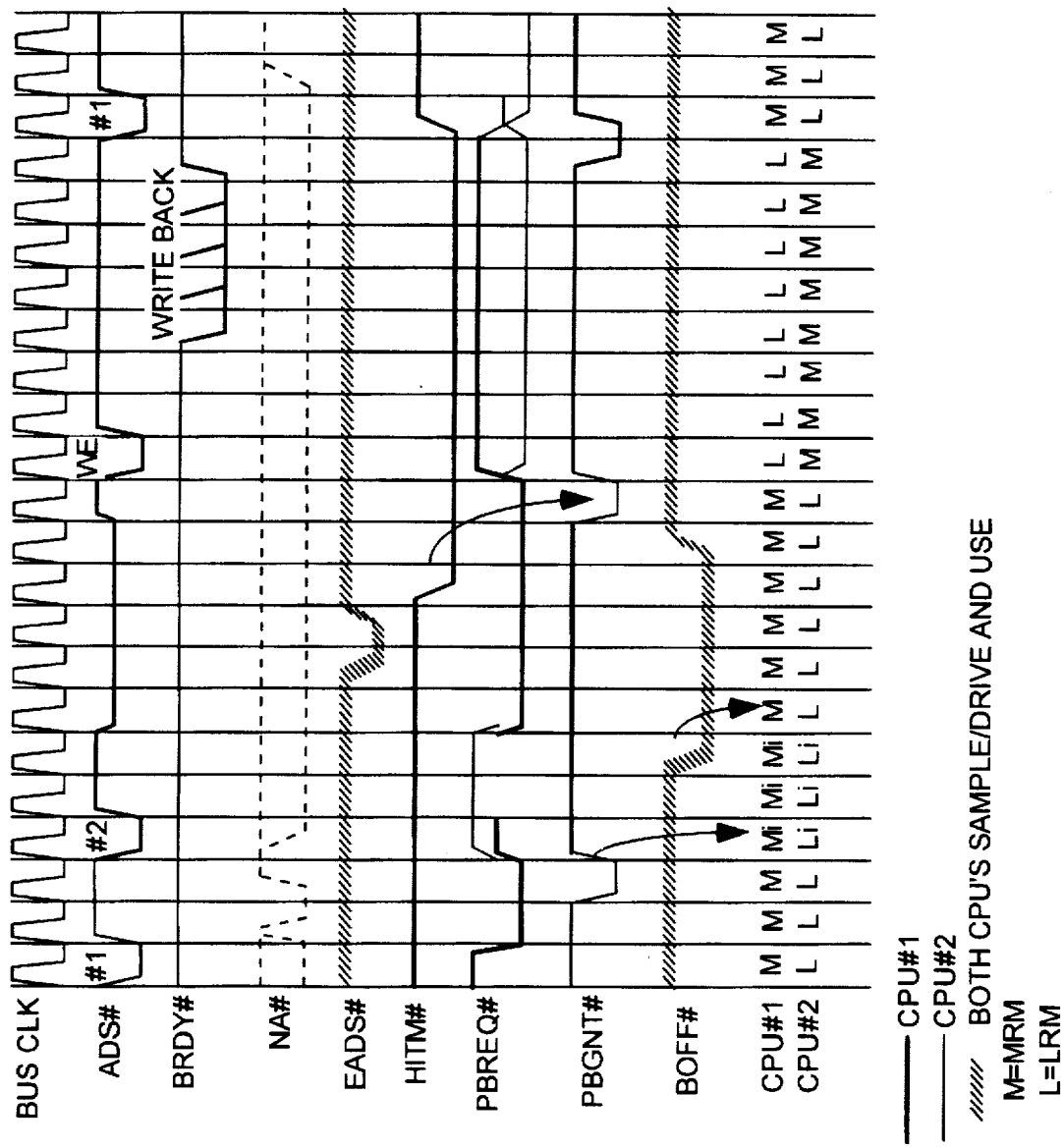
FIG. 8 illustrates a timing diagram example of a bus master transfer that is interrupted due to an external snoop hit of a modified line.

Referring to FIG. 8, CPU #1 is the initial Most Recent Master. CPU #1 issues its last bus transaction by placing an address on the address bus and asserting the address strobe (ADS#). Simultaneously, CPU #2 is requesting the processor bus by asserting the Processor Bus Request (PBREQ#) line. After issuing its last bus transaction, CPU #1 grants partial control of the processor bus by asserting the Processor Bus Grant (PBGNT#) line and moving into the Most Recent Master Inter-CPU Pipeline state (MRM-ICP) state 230. Correspondingly, CPU #2 enters the Least Recent Master Inter-CPU Pipeline state (LRM-ICP) state 270 and issues a bus transaction by placing an address on the address bus and asserting the address strobe (ADS#).

Before the data from CPU #1's last bus transaction is ready, an external device asserts the Back-Off (BOFF#) signal line. The Back-Off (BOFF#) signal forces both CPU #1 and CPU #2 to abandon their current bus transactions and float the bus. Furthermore, CPU #1 and CPU #2 return to their previous main states. Thus, CPU #1 returns to the Most Recent Master (MRM) state 210 and CPU #2 returns to the Least Recent Master (LRM) state 250.

After asserting the Back-Off (BOFF#) signal line, the external device waits such that the processors have time to get off the bus. Two clock cycles after asserting the Back-Off (BOFF#) signal line, the external device begins an inquire cycle by placing an address on the address bus and asserting the External Address Strobe (EADS#).

In response to the External Address Strobe (EADS#), each processor examines its internal cache to see if the memory location specified on the address bus is represented within the internal cache. If the memory location is represented in the internal cache, then the processor asserts the external snoop Hit (HIT#) line. If the hit cache line has been modified, then the processor also asserts the external snoop Hit modified (HITM#) line. If the current Most Recent Master asserts the external snoop Hit modified (HITM#) line, the that Most Recent Master must write-back the modified line into cache memory as soon as the Back-Off (BOFF#) signal is released.

However, in the example of FIG. 8, the Least Recent Master contains a modified version of the address that the external device is inquiring about. Thus, the Least Recent Master must write the modified cache line back into main memory.

Referring to FIG. 8, when the Back-Off (BOFF#) signal is released, the write-back procedure must begin. To allow the Least Recent Master, CPU #2 in this example, write back the modified cache line, the Least Recent Master must first enter Most Recent Master state such that it obtains control of the processor bus. Since the external snoop Hit modified (HITM#) acts as the highest priority bus request, CPU #1 immediately grants the processor bus to CPU #2 in response to the external snoop Hit modified (HITM#) line by asserting the Processor Bus Grant (PBGNT#) line. After granting the processor bus to CPU #2, CPU #1 enters the Least Recent Master (LRM) state 250. Similarly, CPU #2 enters the Most Recent Master (MRM) state 210 with control of the processor bus.

Once CPU #2 enters the Most Recent Master (MRM) state 210, CPU #2 begins the write-back of the modified cache line. CPU #2 retains control of the processor bus until the write-back of the modified cache line is done. CPU #2 then releases the processor bus back to CPU #1 by asserting the Processor Bus Grant (PBGNT#) line. This causes CPU #1 to move from the Least Recent Master (LRM) state 250 back to the Most Recent Master (MRM) state 210 along state transition path 245. Similarly, CPU #2 moves from the Most Recent Master (MRM) state 210 back to the Least Recent Master (LRM) state 250 along state transition path 241.

Once CPU #1 returns to the Most Recent Master (MRM) state 210, CPU #1 can finally reissue its bus transaction that was interrupted when the Back-Off (BOFF#) signal was asserted. Similarly, CPU #2 will request the processor bus by asserting the Processor Bus Request (PBREQ#) line so it can also reissue its interrupted bus transaction. Thus, the two reissued bus transactions will take place in the same order that they were originally issued. Since the interrupted bus transactions are reissued in the same order, the dual processor system acts exactly the same as a uniprocessor system. Thus, the dual processor system is transparent to the rest of the computer system and appears to be a uniprocessor system.

Additional External Snooping considerations

As previously stated, an inquire can be initiated when an external device gets control of the address bus using the Address Hold signal (AHOLD), the Hold (HOLD) signal (which is acknowledged by the HLDA signal), or Back-Off (BOFF#) signal lines. Each technique has various issues to consider.

If the Address Hold signal (AHOLD) is asserted for the inquire cycle, then the writeback bus transaction may be issued while AHOLD is still active. Prior to the writeback, all outstanding bus cycles will be completed.

If the Hold (HOLD) signal is asserted for the inquire cycle, then the external device must wait for the Hold Acknowledge (HLDA) signal before issuing its inquire transaction. After a modified cache line is detected in an processor internal cache (HITM# asserted), the processor must wait for Hold Acknowledge (HLDA) signal to be released before performing the writeback bus transaction.

If the Back-Off (BOFF#) signal is asserted for the inquire, then the processor must wait for Back-Off (BOFF#) signal to be released before performing the write-back bus transaction. Furthermore, if there are any outstanding bus transactions when the Back-Off (BOFF#) signal was asserted, then those bus transactions must be reissued after the write-back is completed in the same order they were originally issued (within Intel® Pentium® uniprocessor exceptions). An example of aborting bus transactions and then later reissuing the bus transactions in the original order was set forth in FIG. 8.

Locked Memory Access Considerations

The processor of the present invention has a locked memory access feature. The locked memory access feature is used to allow atomic Read-Modify-Write accesses that are used to implement semaphores. To perform an atomic memory access, the processor asserts a locked memory access (LOCK#) signal while the processor is performing a memory access. An example of an atomic Read-Modify-Write access is provided with reference to FIG. 9.

Figure 9:
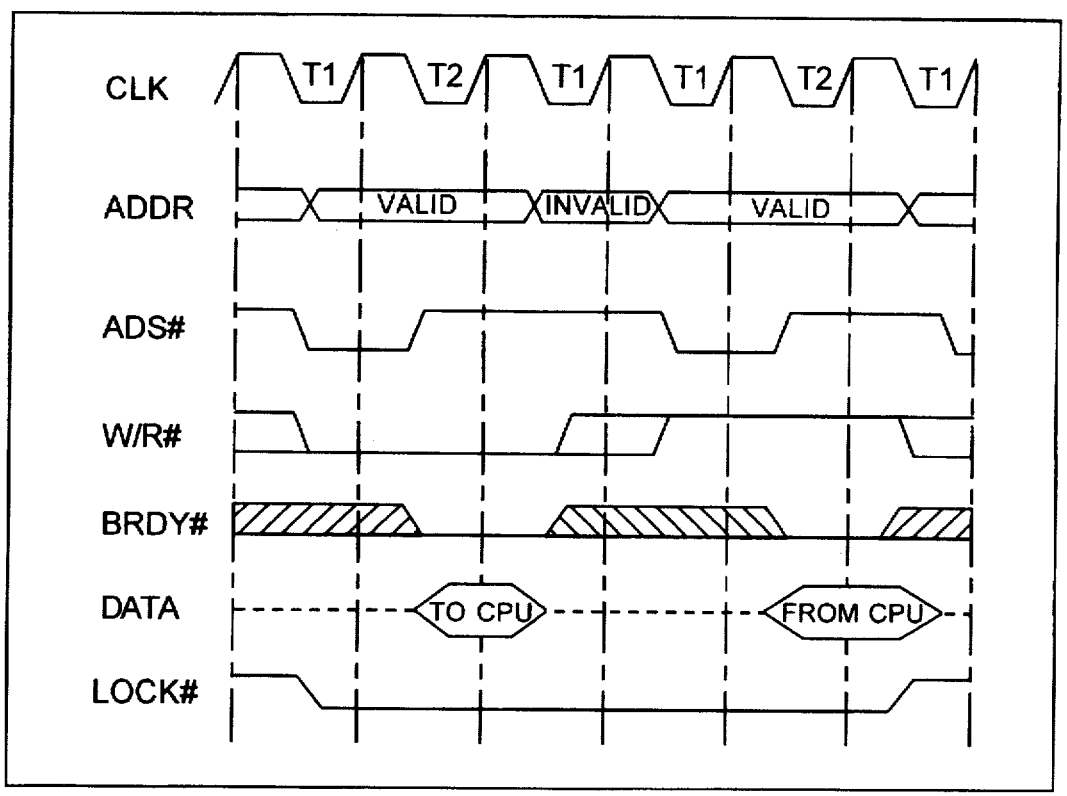
FIG. 9 illustrates a timing diagram example of locked memory access.

Referring to FIG. 9, a processor places an address on the address bus and then asserts the Address Strobe (ADS#) along with the Locked access (LOCK#) line. Since the first memory access is a read, the Write/Read line (W/R#) specifies a read operation. When the data is ready, the Burst Ready (BRDY#) signal is asserted. The processor keeps the locked access (LOCK#) signal asserted to maintain the locked memory access.

Next, the processor performs a write by places an address on the address bus, asserting the Address Strobe (ADS#), and specifying a write on the Write/Read line (W/R#). Meanwhile, the Locked access (LOCK#) line is still asserted. After the write is completed as signaled by the Burst Ready (BRDY#) signal, the processor finally releases the Locked access (LOCK#) line.

In most situations, the processor executing the locked memory access will complete without interrupt. However, if the processor attempts a locked memory read on a memory location that is represented in a modified cache line of a partner processor, then the locked access must be interrupted to perform a write-back of the modified cache line.

When a Most Recent Master processor attempts a locked read that accesses memory location that is represented a modified cache line, then the Least Recent Master (LRM) processor will assert the Private-snoop Hit Modified (PHITM#) line. The Most Recent Master processor will complete the read operation, however it will ignore the data received due to the assertion of the Private-snoop Hit Modified (PHITM#) line.

The assertion of the Private-snoop Hit Modified (PHITM#) line causes the Least Recent Master processor to obtain ownership of the processor bus such that it can write-back the modified cache line. The write-back is performed with the Locked access (LOCK#) line still asserted. Furthermore, the processor that asserted the Private-snoop Hit Modified (PHITM#) line will invalidate that cache line. Meanwhile, the original processor is requesting the bus back by asserting the Processor Bus Request (PBREQ#) line. After writing back the modified cache line, the processor bus control is given back to the original processor such that it can reissue its locked memory access. Note that the entire interruption of the locked memory access is transparent to other devices such that the dual processor system appears just like a uniprocessor system.

If the Most Recent Master performs a locked read on a memory location that is represented in the cache of the Least Recent Master but has not been modified, then the Least Recent Master will invalidate its cache line to avoid any coherency corruption. However, no writeback is necessary in this situation since the cache line was not modified.

The foregoing has described methods and apparatus for implementing a dual processing protocol. It is contemplated that changes and modifications may be made by one of ordinary skill in the art, to the materials and arrangements of elements of the present invention without departing from the scope of the invention.

We claim:

1. In a computer system, a method of transferring ownership of a processor bus from a first processor to a second processor, said method comprising the steps of:

initiating a first bus transaction from said first processor that access a first memory location;

snooping said first bus transaction with said second processor;

asserting a private snoop hit modified line if said first memory location accessed by said first processor is represented in a modified cache line in said second processor, said private snoop hit modified line coupled to said first processor; and transferring ownership of said processor bus from said first processor to said second processor in response to said asserted private snoop hit modified line.

2. The method as claimed in claim 1 further comprising the step of:

writing said modified cache line in said second processor back into a main memory.

3. The method as claimed in claim 2 further comprising the step of:

transferring ownership of said processor bus from said second processor back to said first processor such that said first processor can reissue said first bus transaction.

4. The method as claimed in claim 1 wherein said step of asserting a private snoop hit modified line occurs two bus clock cycles after initiating said first bus transaction.

5. The method as claimed in claim 1 wherein said step of asserting an external hit modified line occurs two bus clock cycles after initiating an inquire bus transaction.

6. In a computer system, a method of transferring ownership of a processor bus from a first processor having ownership of said processor bus to a second processor, said method comprising the steps of:

initiating an inquire bus transaction about a first memory location on said processor bus from an external device;

asserting an external hit modified line from said second processor if said first memory location accessed by said external device is represented in a modified cache line in said second processor, said private snoop hit modified line coupled to said first processor; and transferring ownership of said processor bus from said first processor to said second processor in response to said asserted external hit modified line.

7. The method as claimed in claim 6 further comprising the step of:

writing said modified cache line in said second processor back into a main memory.

8. The method as claimed in claim 7 further comprising the step of:

transferring ownership of said processor bus from said second processor back to said first processor such that said first processor.

9. In a dual processor computer system, said dual processor computer system comprising a first processor, a second processor and a processor bus, a method of implementing a processor back-off protocol, said method comprising the steps of:

initiating a first bus transaction from said first processor;

transferring ownership of said processor bus to said second processor;

initiating a second bus transaction from said second processor after said first bus transaction;

interrupting said first and second bus transactions by asserting a back-off signal from an external device;

initiating a third bus transaction from said external device;

releasing said back-off signal;

re-initiating said first bus transaction from said first processor; and re-initiating said second bus transaction from said second processor after re-initiating said first bus transaction.

10. The method as claimed in claim 9 wherein said step of transferring ownership of said processor bus to said second processor transfers only partial control of said processor bus to said second processor.

11. The method as claimed in claim 10 wherein said step of interrupting said first and second bus transactions by asserting a back-off signal causes processor bus ownership to revert back to said first processor.

12. In a dual processor computer system, said dual processor computer system comprising a first processor, a second processor and a processor bus, a method of implementing a locked memory access, said method comprising the steps of:

initiating a locked memory read operation from said first processor;

asserting a private snoop hit modified line from said second processor if said locked memory read operation accesses a modified cache line in said second processor transferring ownership of said processor bus to said second processor;

completing said locked memory read operation from said first processor but ignoring returned data;

transferring ownership of said processor bus from said first processor to said second processor in response to said private snoop hit modified line;

writing back said modified cache line from said second processor into said main memory;

transferring ownership of said processor bus from said second processor back to said first processor after said writing back; and re-initiating said locked memory read operation.

13. The method as claimed in claim 12 wherein said step of initiating a locked memory read operation comprises asserting a locked memory access signal.

14. The method as claimed in claim 13 wherein said step of writing back is also performed while asserting a locked memory access signal.

15. A computer processor, said computer processor coupled to a processor bus, said computer processor comprising:

a processor bus request input signal, said processor bus request input signal asserted by a partner processor when said partner processor needs said processor bus;

a private snoop-hit modified input signal, said private snoop-hit modified input signal asserted by a partner processor when said partner processor needs said processor bus due to a hit on a modified cache line, said private snoop-hit modified input signal acting as a request for said processor bus with a priority higher than said processor bus request input signal; and an external hit modified input signal, said external hit modified input signal asserted by said partner processor when an external device is accessing a memory location represented in a modified internal cache line of said partner processor, said external hit modified input signal acting as a request for said processor bus with a priority higher than said private snoop-hit modified input signal.

16. The apparatus as claimed in claim 15 further comprising: a processor bus grant output signal, said processor bus grant output signal asserted when said computer processor grants said processor bus to said partner processor.

17. A computer processor, said computer processor coupled to a processor bus, said computer processor comprising:

a private snoop-hit modified input signal, said private snoop-hit modified input signal asserted only when a partner processor detects a hit on a modified cache line in said partner processor; and an external hit modified input signal, said external hit modified input signal asserted by a partner processor only when an external device is accessing a memory location represented in a modified internal cache line of said partner processor.

18. The apparatus as claimed in claim 17 wherein said private snoop-hit modified input signal is only driven by a private snoop-hit modified output signal on said partner processor.

* * * * *